United States Patent [19] [11] 4,002,432
Brice et al. [45] Jan. 11, 1977

[54] VAPOR-LIQUID SEPARATOR

[75] Inventors: John C. Brice, London, England; Jose M. A. Peruyero, Morris Plains, N.J.

[73] Assignee: Exxon Research & Engineering Co., Linden, N.J.

[22] Filed: Apr. 25, 1975

[21] Appl. No.: 571,782

[52] U.S. Cl. .............................. 23/284; 23/288 R; 23/260; 23/263; 208/100; 208/102; 208/103; 208/146; 208/143; 55/1; 55/41; 55/185; 55/186; 55/187; 55/188; 55/193; 55/199; 55/462; 55/434; 55/440

[51] Int. Cl.² ...................... B01D 19/00; B01J 8/02

[58] Field of Search .................. 23/288 R, 260, 263, 23/284, 283; 208/100, 102, 103, 146, 143; 55/1, 41, 185–188, 193–199, 462–465, 434, 440–446

[56] References Cited
UNITED STATES PATENTS

| 710,655 | 10/1902 | Angell | 55/442 X |
|---|---|---|---|
| 1,710,178 | 4/1929 | McMurray | 55/188 |
| 3,057,335 | 10/1962 | Osborne | 55/463 UX |
| 3,492,795 | 2/1970 | Guerrieri | 55/463 |
| 3,702,237 | 11/1972 | Watkins | 23/288 R |

Primary Examiner—James H. Tayman, Jr.
Attorney, Agent, or Firm—Marthe L. Gibbons; F. Donald Paris

[57] ABSTRACT

A vapor-liquid separator is provided which is adapted to be connected directly to the exit of a fixed reactor bed, and includes a vertically disposed housing, an upper portion of which is connected to vapor-liquid inlet means which may be provided by the fixed bed reactor so that a vapor-liquid mixture may be introduced downwardly into the housing. An internal portion of the housing defines a vapor-liquid separation zone and includes liquid diverting means for defining a liquid flow path from the vapor-liquid inlet means downwardly about an inner periphery of the housing, liquid outlet means disposed below the liquid diverting means, vapor collection means for defining a downwardly directed vapor flow path from the vapor-liquid inlet means which flow path is spaced from the inner periphery of the housing as well as from the flow path of the downwardly flowing liquid, vapor diverting means disposed below the vapor collection means and spaced from the inner periphery of the housing for diverting the downwardly directed vapor flow path upwardly in said separation zone but spaced from the inner periphery of the housing, and vapor outlet means disposed in the flow path of the upward flow of vapor. In addition, a method is provided for separating a vapor from a liquid which method may be carried out employing the above vapor-liquid separator.

9 Claims, 3 Drawing Figures

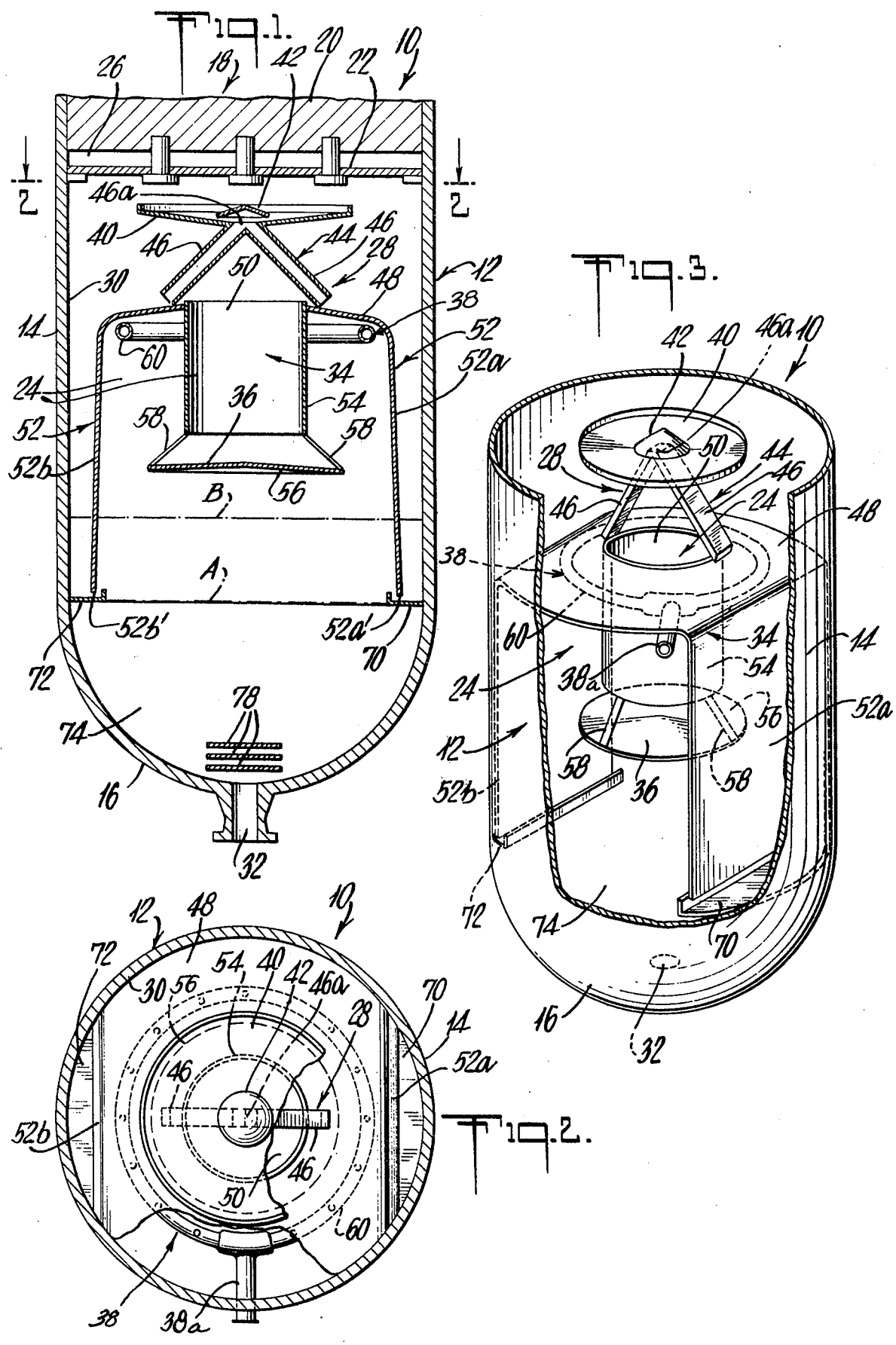

VAPOR-LIQUID SEPARATOR

FIELD OF THE INVENTION

The present invention is directed to a vapor-liquid separator which is adapted to be directly connected to the exit of a fixed bed reactor and to a method for separating a vapor from a liquid.

BACKGROUND OF THE INVENTION

Until now, vapor-liquid mixtures exiting from mixed-phase fixed bed catalytic reactors have been separated into separate vapor and liquid phases by means of vertically or horizontally-disposed separator drums separate to and installed downstream of the reactors. The vapor-liquid mixtures are normally transported at relatively high velocities, for example, 20 to 50 ft./sec., from the reactor to the separator drums, where separation is effected.

The effectiveness of a vapor-liquid separator depends on the minimum droplet size that can be separated in the device and the quantity of material in the mixture to be separated is in the form of droplets smaller than this minimum droplet size. Accordingly, it will be appreciated that the larger the droplet size in the mixture to be separated, and the smaller the quantity of material in the mixture in the form of droplets smaller than the minimum droplet size that can be separated, the more effective the separation. Moreover, the drop size distribution of a vapor-liquid mixture is critically dependent on its previous history. For example, when such a mixture is transported under high velocities, it is subjected to high shear stresses with the results that a greater proportion of small droplets form than if it were transported at relatively low velocities. Notwithstanding the above, where the conventional separation drums are employed downstream of the fixed bed reactors, the mixtures to be separated are transported under the relatively high velocities of 20 to 50 ft./sec. in order to reduce the size and cost of the transfer line, even though separation effectiveness is somewhat sacrificed.

BRIEF STATEMENT OF THE INVENTION

The vapor-liquid separator of this invention overcomes the disadvantages associated with the use of the prior art separators in that the present vapor-liquid separator may be connected directly to the exit of a fixed bed or other type reactor to take advantage of the large drops and sheets of liquid exiting from the reactor bed. The effluent from the reactor has been subjected to only low velocities and the amount of finely dispersed droplets will be kept to a minimum. Accordingly, effectiveness of the separation performed by the separator of the invention is greatly enhanced relative to the separation accomplished employing conventional separation drums. Furthermore, in addition to providing a more effective separation, use of the separator of the invention eliminates the need for transfer lines as well as a separate drum inasmuch as the present separator may be connected directly to the exit of the fixed bed or other type reactor.

Thus, in accordance with the present invention, there is provided a vapor-liquid separator which may be connected directly to the exit or bottom portion of a mixed-phase (liquid and vapor) fixed bed reactor or other type reactor, which separator includes a substantially vertically disposed housing defining a vapor-liquid separation zone, vapor-liquid inlet means connected to the housing for introducing vapor-liquid mixture downwardly into the separation zone, liquid diverting means disposed in the separation zone and defining a liquid flow path from the vapor-liquid inlet means downwardly about an inner periphery of the housing, liquid outlet means disposed in the housing below the liquid diverting means, vapor collection means disposed in the separation zone and defining a downwardly directed vapor flow path from the vapor-liquid inlet means into the separation zone and spaced from the inner periphery of the housing and the flow path of the downwardly flowing liquid, vapor diverting means disposed in the housing below the vapor collection means and spaced from the inner periphery of the housing for diverting the downwardly directed vapor flow path upwardly and spaced from the inner periphery of the housing, and vapor outlet means disposed in the path of the upward flow of the vapor.

The vapor is collected in a vapor collector ring in the path of the upward flow of the vapor. This region is separated from the separation zone by the annular liquid collector ring and circular vapor downcomer.

In addition, a method is provided for separating a vapor from a liquid, which method may be carried out employing the above vapor-liquid separator of the invention, which method includes the steps of passing a vapor-liquid mixture downwardly into a vertically elongated separation zone, diverting the flow of liquid downwardly along the inner periphery of the separation zone, diverting the flow of vapor downwardly through an intermediate portion of the separation zone spaced from the inner periphery thereof and also spaced from the path of flow of the liquid, diverting the downward flow of vapor upwardly spaced from the inner periphery of the separation zone, collecting the downwardly flowing liquid and collecting the upwardly flowing vapor.

BRIEF DESCRIPTION OF THE FIGURES

FIG. 1 is a schematic cross-sectional representation of a preferred embodiment of a vapor-liquid separator in accordance with the present invention;

FIG. 2 is a cross-sectional view of the apparatus shown in FIG. 1 taken along lines 2—2 thereof; and FIG. 3 is a perspective view of the apparatus shown in FIG. 1 with parts broken away to more clearly show the construction of such apparatus.

DETAILED DESCRIPTION OF PREFERRED EMBODIMENTS OF THE INVENTION

Referring now to the accompanying Figures wherein like parts are referred to by the same numerals, there is shown a preferred vapor-liquid separator in accordance with the present invention and identified generally by the numeral 10. The separator 10 includes a vertically disposed housing 12 which as shown in FIGS. 2 and 3 is preferably of a substantially cylindrical shape, but may be of other shape, and includes side walls 14 connected to an eliptical or hemispherical head 16. In the separator shown in the Figures, the side walls 14 are merely the extension of a fixed catalyst bed reactor 18 as shown. Thus, the separator 10 in the preferred embodiment is an extension of the reactor 18 and extends from the bottom portion thereof in a manner such that liquid and vapor flowing from the fixed catalyst bed 20 passes downwardly directly into the separator 10. However, it will be appreciated that the separator 10 may be employed with any type of reactor and may be separated therefrom or joined directly thereto.

As shown, the fixed catalyst bed 20 is separated from the separator 10 by means of a filter or screen element 22 which prevents solids of particle size greater than about 1,500 microns or the catalyst particle sizes, whichever is less, from entering the separator 10.

The separator 10 includes a separation zone generally indicated by the numeral 24 which is disposed immediately below the fixed catalyst bed 20. Inlet means 26, as shown will generally comprise the bottom portion or exit of the fixed bed reactor 18 and is in communication with the separation zone 24, for introducing vapor-liquid mixture downwardly into the separation zone 24. Liquid diverting means generally indicated by the numeral 28 is disposed in the separation zone and defines a liquid flow path from the vapor-inlet means 26 downwardly onto collector pan 40 through chute members 46 and via downcomers 52 to liquid reservoir 74. Liquid outlet means 32 is disposed in the bottom portion or head 16 of the housing 12, as shown. A control valve of conventional construction may be connected to the liquid outlet means to control flow of liquid from the separation zone 24 and housing 12.

The separation zone 24 also includes vapor collection means generally indicated by the numeral 34 which defines a downwardly directed vapor flow path from the vapor-liquid inlet means 26 into the separation zone 24, which flow path is spaced from the inner periphery 30 of the housing 12 and the flow path of the downwardly flowing liquid. Also provided in the separation zone 24 are vapor diverting means 36 which is disposed in the housing 12 below the vapor collection means 34 and spaced from the inner periphery 30 of the housing 10, for diverting the downwardly directed vapor flow path upwardly and spaced from the inner periphery 30. Vapor outlet means 38 best shown in FIGS. 2 and 3 is disposed in communication with the separation zone 24 in the path of the upward flow of vapor.

The liquid diverting means 28 preferably comprises a liquid collector pan 40 with a center outlet 46a which connects to two liquid chutes 46 shown best in FIGS. 2 and 3. Furthermore, the liquid diverting means 28 includes liquid baffle means generally indicated by the numeral 44 and which includes the downwardly directed liquid chute members 46 connected to the liquid collector pan 40, and a liquid collector ring 48 including an opening 50 therein disposed below the liquid collector pan as shown best in FIG. 3. The liquid collector ring 48 includes liquid downcomers 52 which in conjunction with the upper portion of the liquid collector ring 48 defines a liquid flow path from the chute members 46 via the liquid downcomers 52 into the liquid reservoir 74. Liquid also runs onto the liquid collector ring 48 directly from the vapor-liquid inlet means, and is also then conveyed onto the liquid downcomers 52.

The chute members 46 will preferably take the form of enclosed rectangular channels which convey the downflowing stream or liquid from the collector pan 40, and separate it into basically two separate streams of liquid which are directed onto the liquid collector ring 48, from which the liquid flows down the walls of the liquid downcomers 52. The chute members 46 will be welded to each other at the top and also welded into the liquid collector pan 40 so as to avoid any leakage of liquid from the collector pan. At their base the liquid chutes 46 will rest upon the liquid collector ring 48 about the periphery of the opening 50 therein as shown in the Figures. In effect, the liquid collector pan 40 creates an opening in the downward falling rain of liquid, through which vapors or gas, in following the line of least resistance, can flow downwardly through the opening 50 in the liquid collector ring and into the vapor collection means, as will be described below. Thus, the vapor can flow into the vapor downcomer 54 without the need for breaking through a continuous unbroken film of liquid.

The sizing of the components of the separator is set to maintain low velocities throughout the device, and is related to the diameter of the housing. The diameter of the liquid collector pan 40 should, therefore, preferably be about 80% of the housing diameter. The vertical distance from the pan 40 to the annular liquid collector ring 48 should preferably be about 12% of the housing diameter. The diameter of the central vapor downcomer 54 should preferably be about 40% of the housing diameter, with the vertical distance between the bottom of the central vapor downcomer 54 and the vapor impact plate 36 preferably set at about 10% of the housing diameter.

The chute members 46 will empty into the annular liquid collector ring 48 in proximity to the edge of the central vapor downcomer 34, with the length of the chutes set by the relative locations of these other parts. The width of the liquid chutes 46 will be about four times the cross-sectional depth, with the cross-sectional area selected so as to drain the liquid acccumulative in the liquid collector pan 40 without its flooding. The means of estimating this area will be determined to one skilled in this art.

The liquid downcomer 52 in combination with the collector ring 48 preferably takes the form of an inverted U-shaped member, the sides 52a and 52b of which are disposed in close proximity to, but spaced from, the inner periphery 30 of the walls 14 of the housing 12. The cross-sectional chord length of the sides 52a and 52b should be about 65% of the housing diameter, but can be increased in order to reduce the liquid superficial velocity in the downcomers, which should typically be less than about 0.2 ft./sec.

The ends 52a' and 52b' of the side walls 52a and 52b, respectively, of the liquid downcomer 52 are disposed in close proximity to, but spaced from, the horizontally disposed walls 70 and 72, respectively, which terminate in inlet weirs. Accordingly, as shown, there will be a small opening between the walls 70 and 72 and the ends 52a' and 52b', respectively, to allow liquid to flow downwardly along the periphery 30 of the housing under the downcomers 52a' or 52b' and over the inlet weirs, into the lower portion or reservoir, 74 or the housing 12. The purpose of the inlet weirs is to thus prevent vapor from passing through the liquid downcomers.

Disposed in the lower portion 74 of the housing 12 are a plurality of anti-vortex baffles 78 to insure substantially quiescent flow of liquid from the lower portion 74 through the liquid outlet means 32.

The vapor collection means 34 preferably takes the form of a vapor downcomer 54, which, as shown, is in the form of a cylindrical tubular member and which is disposed below the opening 50 of the liquid collector ring 48 and is welded about such periphery.

The vapor diverting means 36, as shown, takes the form of a vapor impact plate 56 which is disposed below the vapor downcomer 54 and connected thereto by means of strut members 58. The vapor impact plate 56 is preferably of circular shape which is at least as large as the diameter of the vapor downcomer 54, and is preferably of 20% larger diameter.

The vapor outlet means 38 preferably takes the form of a vapor outlet collector ring 60 which is disposed about the vapor downcomer 54 and above the vapor impact plate 56. The vapor outlet collector ring 60 may be supported from the liquid collector ring or the vapor downcomer 54 by strut members as will be apparent to one skilled in the art. The vapor outlet collector ring 60 will include a plurality of perforations on the top surface for receiving vapor flowing upwardly from the vapor impact plate 56. Vapor outlet conduit 38a will be connected to the vapor outlet ring 60 as shown for recovery of vapor from the separator 10.

It will be appreciated that the materials of construction of the vapor-liquid separator of the invention including the various components discussed above will comprise materials which are substantially inert to the vapor-liquid mixture introduced into the housing.

The vapor-liquid separator of the invention operates as follows.

A mixture of liquid and vapor flowing concurrently and downwardly from the fixed bed reactor 18 passes by means of the vapor-liquid inlet means 26 into the separator 10. A portion of the liquid flows by gravity outside of the liquid collector pan 40 into direct contact with the liquid collector ring 48 which causes such liquid to be diverted toward the side walls 14 of the housing 12 and down along the periphery 30 between the walls 14 and the sides 52a, 52b, of the liquid downcomer 52. Another portion of the liquid flowing from the fixed bed reactor 18 flows onto the liquid collector pan 40 and through the opening 42 therein, down along the chute members 46 into contact with the liquid collector ring 48 and thence down the liquid downcomers 52a, 52b. Liquid flowing between the inner periphery and the liquid downcomers 52a, 52b then passes through the opening between the ends 52a', 52b' and the walls 70 and 72, respectively into the lower portion 74 of the housing 12. The liquid collects in the bottom portion 74 so that a low liquid level indicated by the broken lines and identified by the letter A is maintained, which low liquid level is located at substantially the same level as the openings between the end 52a' and wall 70 and the end 52b and wall 72. It will be appreciated that the level of liquid in the bottom portion 74 of the housing 12 should be maintained at least at the level A in order to minimize the amount of gas entrained due to splashing at the liquid level.

The highest level which the liquid is allowed to build up in the housing 12 is indicated by the broken lines and identified by the letter B and is kept below the vapor impact plate 56, in order to prevent the re-entrainment of liquid from the liquid pool stored in the housing 12 in the vapor stream flowing upwardly to the vapor outlet means 38.

The vapor stream flows about the liquid collector pan 40 through the openings between the chute members 46 into the opening 50 of the liquid collector ring 48, down through the vapor downcomer 54 and into contact with the vapor impact plate 56 and then is caused to flow upwardly into the vapor collector ring 60 and out the vapor outlet means 38a where it may be collected.

It will be appreciated that the vapor flowing through the vapor downcomer 54 will include some liquid drops. However, as such vapor contacts the vapor impact plate 56, a good portion of such liquid drops will be retained on the vapor impact plate and then fall by gravity into the lower portion 74 of the housing 12.

The separation of the vapor from the liquid may be carried out employing atmospheric pressures, sub-atmospheric pressures or super-atmospheric pressures as will be apparent to one skilled in the art. Furthermore, the separation may be carried out at room temperature or at elevated temperatures depending upon the nature of the vapor and liquid to be separated from each other.

In a preferred embodiment of the present invention, the vapor liquid feed will be fed into the separator directly from a fixed reactor bed with the inlet velocity, depending upon the reactor outlet vapor liquid flow, typically at a velocity of about 0.1 to about 5.0 ft./sec. In applications where the inlet velocity can be independently determined, it would preferably be set in the range of 0.3 to 0.5 ft./sec. in order to ensure that the mixture will contain substantially large drops. For example, under the preferred conditions as mentioned above, the average droplet size in the mixture will range from about 0.3 to 3 cm. (0.1 to 1.2 inches).

The separator of the invention may be employed to separate various types of vapors from various types of liquids such as for example:

A. Separation of hydrogen-containing vapor from a hydrocarbon liquid at the exit of a fixed reactor bed.

| HYDROCARBON LIQUID | PROCESS |
| --- | --- |
| Kerosene a Jet-Fuel | Hydrosweetening |
| Atmospheric distillate oil | Hydrotreating |
| Vacuum distillate oil | Vacuum Gas Oil Hydrodesulfurization |
| Residual Oil | Residual fuel oil Hydrodesulfurization |

B. Any vapor and liquid mixture exiting concurrently from a fixed bed reactor below critical conditions in which the gas phase is continuous.

It will be appreciated that the dimensions of the various components of the separator of the invention are chosen to minimize vapor velocities to reduce fine droplet generation before the separation is achieved and to prevent or minimize liquid re-entrainment from the liquid pools.

What is claimed is:

1. A vapor-liquid separator comprising, in combination, a substantially vertically disposed housing having an inner periphery and including a vapor-liquid separation zone; vapor-liquid inlet means connected to said housing at one end thereof for introducing vapor-liquid mixture downwardly into said separation zone; liquid collecting and diverting means disposed in said separation zone for receiving liquid from said vapor-liquid inlet means and directing said liquid downwardly about said inner periphery of said housing; liquid outlet means disposed at the opposite end of said housing; vapor collection means disposed in said separation zone below said liquid diverting means for receiving vapor from said vapor-liquid inlet means causing it to flow downwardly and spaced inward from the inner periphery of said housing and said liquid diverting means in the location where said liquid flows downwardly about said inner periphery; vapor diverting means disposed in said housing and operably connected for cooperation with said vapor collection means at the end thereof opposite from said liquid diverting means and spaced inward from the inner periphery of said housing for diverting the downwardly directed vapor flow in said vapor collection means in an upward direction externally of said vapor collection means; and vapor outlet means disposed in said separation zone externally of said vapor collection means and spaced upward from said vapor diverting means in the flow path of said upward flow of said vapor for receiving and expelling the vapor flow.

2. The vapor-liquid separator in accordance with claim 1 wherein said liquid diverting means comprises a liquid collector pan having at least one opening therein and liquid baffle means connected in communication with said opening in said liquid collector pan for diverting the path of liquid flowing downwardly through said opening in said liquid collector pan toward the inner periphery of said housing.

3. The vapor-liquid separator in accordance with claim 2 wherein said liquid baffle means includes downwardly directed liquid chute members, and said liquid diverting means also includes at least a partially annular liquid collector member including at least one opening therein disposed below said liquid chute members, said member extending vertically down from below said chute members for a predetermined distance and transversely toward said inner periphery of said housing and terminating in spaced relation thereto, said chute members having their outlets arranged for expelling liquid into contact with said annular member adjacent said opening.

4. The vapor-liquid separator in accordance with claim 3 wherein said vapor collection means comprises an annular vapor downcomer member disposed below and in communication with said opening in said liquid collector member, and said vapor diverting means comprises a vapor impact plate connected at the bottom of said vapor downcomer member for diverting the downward flow of vapor from said vapor downcomer in an upward direction externally of said downcomer towards said vapor outlet means.

5. The vapor-liquid separator in accordance with claim 4 wherein said vapor outlet means comprises a vapor outlet collection ring disposed below an upper portion of said liquid diverting means for collecting vapor directed upwardly by said impact plate, and a vapor outlet conduit connected to said vapor outlet collection ring.

6. The vapor-liquid separator in accordance with claim 3 wherein said liquid collector member includes downward extending side walls spaced from but in close proximity to the inner periphery of said housing.

7. The vapor-liquid separator in accordance with claim 3 wherein said liquid collector member comprises an inverted U-shaped member having an upper horizontal portion and downward extending side walls and wherein said opening is centrally disposed in said horizontal portion.

8. The vapor-liquid separator in accordance with claim 1 wherein said housing is connected directly to a fixed bed reactor, and said fixed bed reactor provides said vapor-liquid inlet means.

9. A vapor-liquid separator comprising a substantially vertically disposed exterior housing having an inner periphery and an inlet end and an outlet end and including a vapor-liquid separation zone whereby vapor-liquid mixture introduced at the inlet end flows in a downward direction into said separation zone; liquid diverter means including a liquid collector pan and liquid baffle means disposed for receiving liquid from said inlet end and directing said liquid downwardly toward the inner periphery of said housing; said liquid diverter means also including a substantially U-shaped member having a horizontal upper portion and side walls extending downwardly for a predetermined distance in spaced relation with reference to said inner periphery of said housing and an opening at the bottom thereof, said upper portion disposed below and in operable association with said liquid baffle means for receiving and directing liquid in a downward direction along said side walls and including a central opening; vapor collection means including a centrally-disposed member within said U-shaped member extending downward from said central opening in said upper portion and an annular vapor collection ring disposed about said centrally-disposed member adjacent said upper portion and including an outlet for the vapor and a vapor diverting plate member disposed at the bottom end of said centrally-disposed member for diverting the downward flow of vapor in an upward direction, whereby it is collected by said vapor collection ring and is expelled through said vapor outlet.

* * * * *